May 27, 1969     I. R. ABEL ET AL     3,446,916
COLLIMATED VIEWING SYSTEM
Filed July 29, 1964
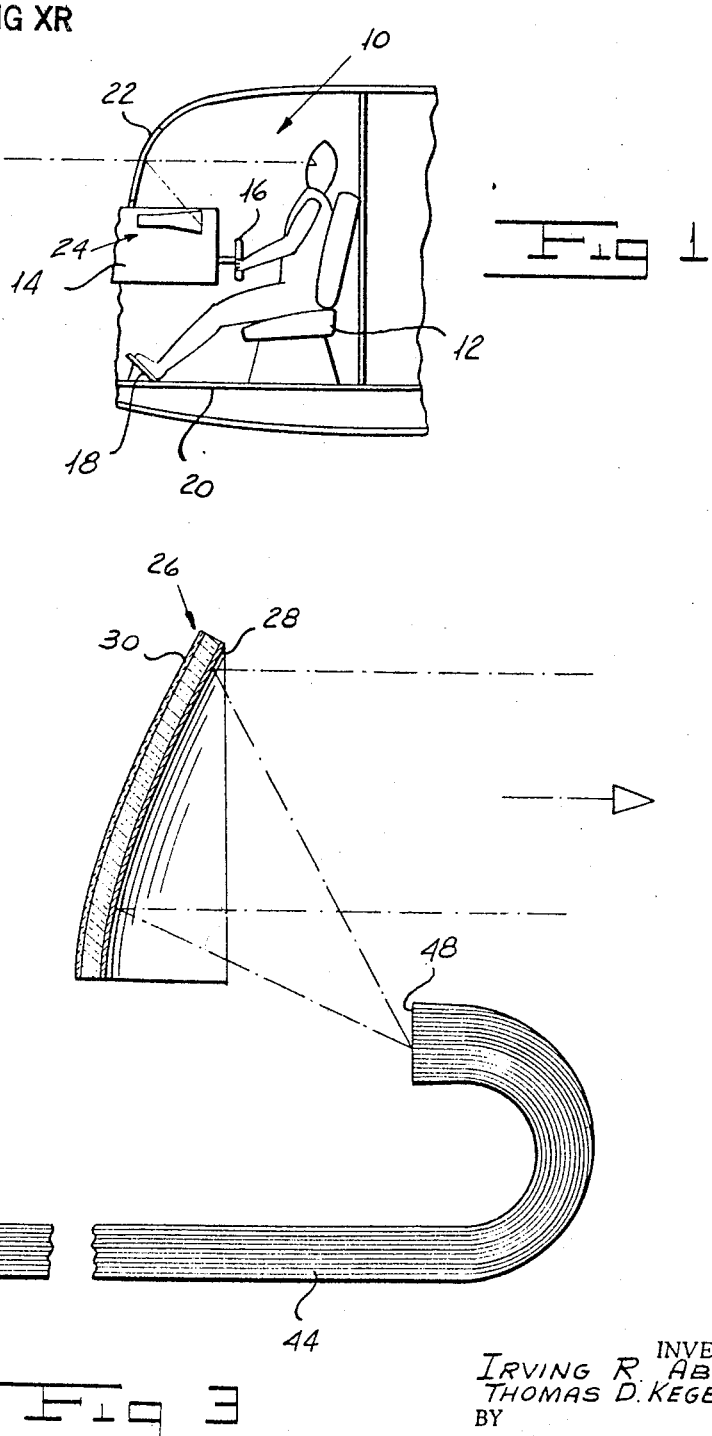
INVENTORS
IRVING R. ABEL
THOMAS D. KEGELMAN
BY
Shenier & O'Connor
ATTORNEYS

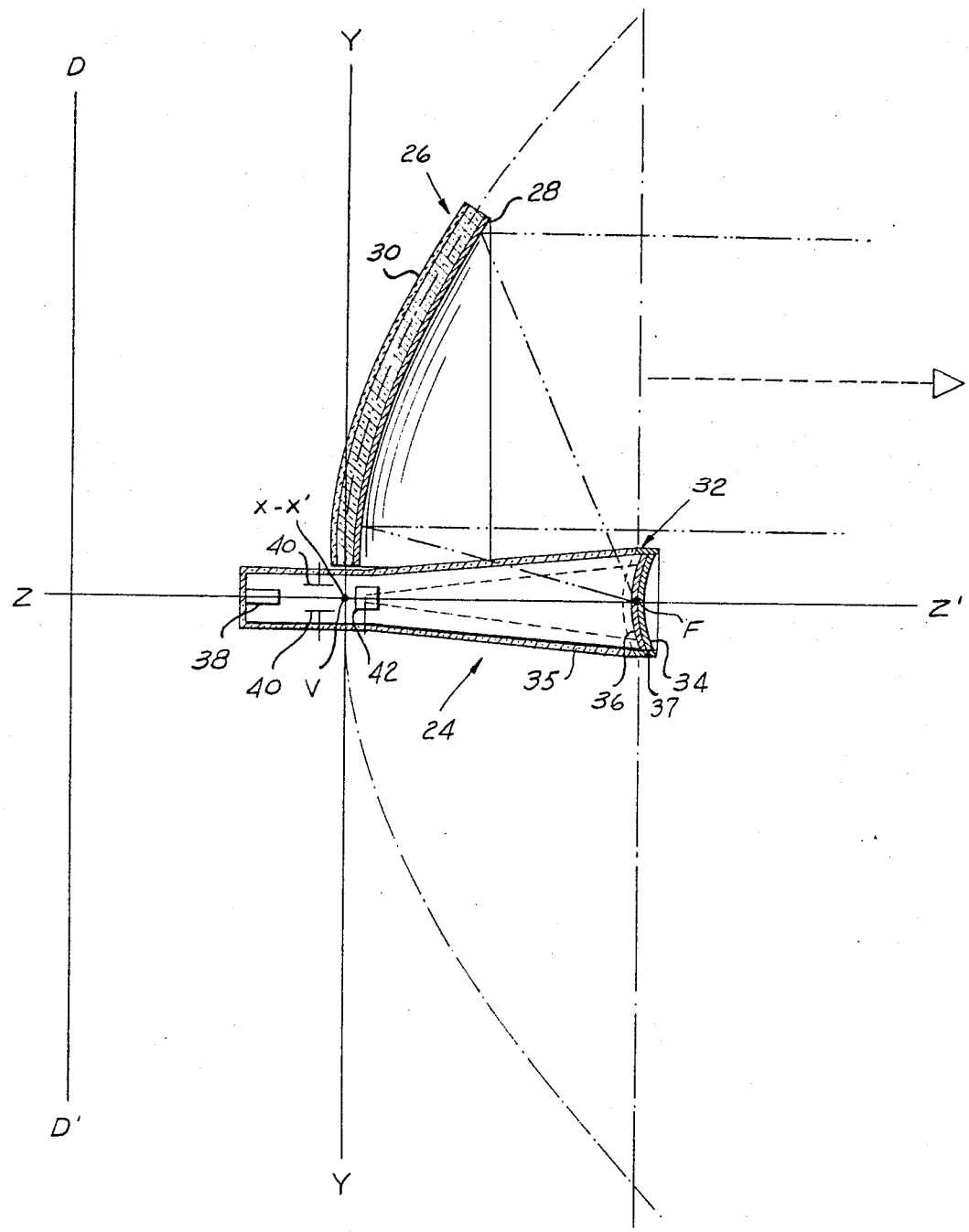

United States Patent Office

3,446,916
Patented May 27, 1969

---

3,446,916
COLLIMATED VIEWING SYSTEM
Irving R. Abel, Norwalk, and Thomas D. Kegelman, Ridgefield, Conn., assignors to United Aircraft Corporation, East Hartford, Conn., a corporation of Delaware
Filed July 29, 1964, Ser. No. 385,880
Int. Cl. H01j 29/10
U.S. Cl. 178—7.85      9 Claims

---

ABSTRACT OF THE DISCLOSURE

An image combiner utilizing a portion of the aircraft window, the inner surface of said portion being coated with a partially reflecting film and being paraboloidal in shape. A cathode ray tube having an aspherically shaped screen is positioned with the screen in the focal plane of said surface whereby information presented on the screen is presented to a viewer by way of the image combiner, while at the same time making it possible to view events outside.

---

Our invention relates to a collimated viewing system and more particularly to an improved viewing system for combining images without substantial distortion while being simple and compact.

It is well known that space within the cabin of an aircraft is at a premium. Owing to the large number of various instruments and controls which must be provided for the pilot's use, it is essential that each individual element of the system occupy as small a space as is possible.

There are known in the prior art various instruments providing images for assisting the pilot in operating the aircraft, particularly when the craft is being landed. At landing breakthrough pilots have a natural tendency to direct their view to the scene outside the aircraft and to ignore the instruments providing the images intended to assist them in making a safe landing. In the prior art, in order to overcome this problem, optical systems have been devised to permit the pilot concomitantly to observe the outside scene and the image from his normal viewing position. One particular system known in the prior art includes a plane, image-combining mirror disposed in front of the pilot's normal viewing position and an optical system of lenses which forms a collimated image of the face of a cathode-ray tube, and is reflected by the combiner. This system, while partially successful, incorporates a number of defects. First, it is relatively complicated, occupies an excessive amount of space, and is relatively expensive. Moreover, it must be corrected for chromatic aberration.

In order to overcome the defects of the system discussed above, it has been suggested that a parabolic image combiner be placed in front of the pilot's normal viewing position. With such an arrangement, if severe optical aberrations are to be avoided, the collimated image must be located on the parabola axis and the sector of the parabola used for collimation must be limited to areas near the axis. To achieve this in the prior art, "over-the-shoulder" optical systems or the like are provided to translate the image to a position in the focal plane of the combiner. This arrangement, in addition to being optically complicated and cumbersome, embodies the defect that the pilot cannot readily shift his viewing position without interfering with the translation of the image to the combiner.

One possible solution to the problem arising in connection with the parabolic combiner discussed above might be to place the image-producing element in a parabolic combiner focal plane between the normal viewing position of the pilot and the combiner. This apparent solution involves the obvious problem of interference with the pilot's view of the outside scene owing to the location of the image-producing element between the pilot's eye and the combiner.

From the foregoing discussion, it will be apparent that none of the viewing systems suggested in the prior art have successfully solved the problem of permitting the pilot to observe an instrument-produced image concomitantly with his view of the outside scene in a simple and expeditious manner without interfering either with his view of the outside scene or with his view of the image.

We have invented a collimated viewing system which overcomes the defects of viewing arrangements of the prior art. Our system is relatively simple and inexpensive as compared with systems of the prior art. It successfully permits the pilot to view an instrument-produced image as well as the outside scene without interfering with his view of either the scene or the image. It successfully achieves this object without interfering with the pilot's freedom of movement. Our system is simple and inexpensive. It occupies a minimum of space.

One object of our invention is to provide a collimated viewing system which overcomes the defects of image-combining arrangements of the prior art.

Another object of our invention is to provide a collimated viewing system which permits an observer concomitantly to view an instrument-produced image and the external scene without interfering with his view of either.

Yet another object of our invention is to provide a collimated viewing system, the elements of which are so arranged as not to interfere with the observer's freedom of movement.

A still further object of our invention is to provide a collimated viewing system which occupies a very small space.

Yet another object of our invention is to provide a collimated viewing system which is simple and inexpensive.

Other and further objects of our invention will appear from the following description.

In general our invention contemplates the provision of a collimated viewing system in which we position an image-providing element in the focal plane of a sectioned aspheric combiner between and below a line from the observer's normal viewing position to the combiner without interfering with the observer's view or freedom of movement and without detracting from the character of the image. Specifically, we may so positioned the back of the faceplate of a cathode-ray tube.

In the accompanying drawings which form part of the instant specification and which are to be read in conjunction therewith and in which like reference numerals are used to indicate like parts in the various views:

FIGURE 1 is a schematic view illustrating the arrangement of our collimated viewing system in use in an aircraft cabin.

FIGURE 2 is a diagrammatic view on an enlarged scale illustrating the various components of our collimated viewing system.

FIGURE 3 is a schematic view of an alternate form of our collimated viewing system.

Referring now to FIGURES 1 and 2 of the drawings, we have illustrated by way of example an aircraft cabin indicated generally by the reference character 10 in which the pilot's chair 12 is located just behind the control panel support 14. Support 14 carries the aircraft control wheel 16. The rudder pedals 18 generally are located on the floor 20 below the support 14. It will readily be appreciated that, as is known in the art, space within the cabin 10 is at a premium. Moreover, the instruments and the like provided for the pilot's use must be so located so as not to interfere with his view through the cabin window 22.

One of the instruments provided to assist the pilot in landing, for example, may include a cathode-ray tube such, for example, as the tube indicated generally by the reference character 24. In the prior art, the pilot views the front of the face of such an instrument. Moreover, there are provided, as is pointed out hereinabove, image-combining systems which enable the pilot to view the picture presented on the face of the tube concomitantly with the outside scene. In order to accomplish this result, the combiners of the prior art employ relatively complicated optical systems for translating the image from the front of the tube face to the combiner.

In our collimated viewing system we employ a combiner indicated generally by the reference character 26 which may be located in and form a part of the window 22. This combiner has an inner surface which is coated with a partially reflecting film 28 such, for example, as a very thin film of aluminum. The outer surface of the combiner is provided with an anti-reflection coating 30 of a suitable material such, for example, as magnesium fluoride. We form the body of the combiner from a transparent material such, for example, as glass or a clear plastic of a suitable thickness.

We provide our combiner 26 with an aspheric shape so as to permit optimum advantage to be taken of the various optical characteristics. More specifically, we may, for example, provide the combiner 26 with a paraboloidal configuration. The aspheric surface can be defined by the focal plane, the optical axis and an aspheric equation for the surface. In the specific case of a paraboloidal surface, the aspheric equation is:

$$z = \frac{x^2 + y^2}{4f}$$

where: $f$=focal length or distance from the vertex V of the paraboloid to the focus F.
$z$=distance measured along the optical axis from the vertex of the parabola.
$x, y$=orthogonal coordinates in the plane perpendicular to the optical axis.

The directrix D–D' of the paraboloidal surface of the combiner is a plane perpendicular to the optical axis at a distance $f$ on the other side of the vertex.

For a rotationally-symmetric aspheric surface, the form is given by the relationship:

(2)
$$z = a(x^2+y^2) + b(x^2+y^2)^2 + c(x^2+y^2)^3 + d(x^2+y^2)^4 + \ldots$$

where $a, b, c, d$, etc. are constant coefficients. It is to be understood that non-rotationally symmetric surfaces may also be used.

In FIGURE 2 we have shown by way of example a paraboloidal combiner 26 having a directrix D–D', a focus F and a vertex V with the dot-dash line indicating the curvature of a cross-section of the combiner.

In our collimated viewing systems we so locate the instrument device such, for example, as the cathode-ray tube 24 with relation to the combiner 26 that the back of the screen indicated generally by the reference character 32 of the tube 24 is viewed by the observer through the medium of the reflecting surface 28 of the combiner. Owing to this arrangement, we may make the screen 32 with a metal target 34 carrying the phosphor coating 36 on which the beam of electrons indicated by the broken line in FIGURE 2 is focused. Since we employ a metal target we are able to operate the tube 24 at higher power than normally is permitted. Moreover, we may polish the surface of the target 34 behind the phosphor 36, thus permitting greater utilization of the light generated in the phosphor. The character of the image is thus enhanced.

We form the body 35 of the tube 32 from transparent glass to permit the surface of the phosphor coating 36 to be viewed. A metal ring 37 acts as a collector for the electrons received by the target 34. Owing to the fact that we employ a metal target 34 there is no appreciable space charge in the tube. Thus better resolution is obtained.

The tube 24 includes an electron gun 38 and deflecting elements such, for example, as vertical deflection plates 40 and horizontal deflection plates 42, as is known in the art, which deflect the electron beam with reference to a predetermined deflection center. It will readily be apparent that the difference in the angles of the light beam and of the electron beam with respect to the axis of the tube 24 makes the light image much more sensitive to the phosphor shape than is the electron image. We locate the image-providing surface 36 generally in the focal plane of the aspheric reflecting surface 28 with the axis of the tube 24 lying along the optical axis of the combiner 26.

We have discovered that for proper collimation of light rays from the phosphor being reflected by the surface 28, that surface preferably is made with a slightly aspheric shape. With the surface so shaped, preferably we locate the deflection center of the tube at the vertex so that the curvature will not interfere with correct angular position. It will readily be understood that the inner and outer surfaces of the combiner are constructed so as to be parallel, or nearly parallel.

There are a number of other features which are of significance in our collimated viewing system. It will be noted that we use a sectioned rather than a fully rotationally-symmetric combiner. Thus we may select the aspheric coefficients so that particular areas of the combiner favor the field angles at which these areas are used. In other words, we may select the aspheric coefficients to favor the angular orientation in which the observer views the target.

We make the minimum parallax areas for different field angles to coincide with areas covered by the field angles by selecting appropriate sets of aspheric coefficients. That is, since the aberration curves corresponding to different field angles peak at different heights on the combiner, we make the aberration curves for those field angles occur at areas on the combiner at which these field angles are viewed.

The aspheric coefficients of our combiner 26 are so selected as to minimize astigmatism. We have discovered that the coefficients selected for this purpose are compatible with the desirable coefficients for the parallax correction. As has been pointed out hereinabove, we minimize distortion by forming the phosphor surface precisely. This formation of the phosphor surface to correct for distortion with linear cathode-ray tube deflection may readily be made compatible with proper focusing owing to the large angular difference between the electron beam focused on the target and the light beam emanating from the phosphor. Since the inner and outer surfaces of the combiner are essentially parallel, the image transmitted through the combiner is substantially unaffected owing to the low over-all refraction introduced.

Referring now to FIGURE 3, we have shown an alternate arrangement of our collimated viewing system in which the image to be viewed may be translated by a lens 46 to an optical pipe 44 made up of fiber optics and thence to a surface 48 located generally in the focal plane of the sectioned aspheric combiner 26.

In use of our system the pilot in his heads-up position may look at the combiner 26. He will then be able to view both the outside scene and the image on the phosphor 36 or on the surface 48 without distortion. The surface carrying the image is so located that the pilot is afforded freedom of movement without interfering with the image reflected by the surface 28. It will be noted that only a single reflecting surface is employed in our system as contrasted with the complicated optical systems of the prior art.

It will be seen that we have accomplished the objects of our invention. We have provided a collimated viewing system which permits an observer concomitantly to view an instrument-produced image and the external scene without interfering with his view of either. Our arrangement is simple. It occupies very little space. We arrange the elements of the system so as not to interfere with freedom of movement of an observer such as a pilot.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A viewing system including in combination a sectioned parboloidal image combiner comprising a transparent body, a partially reflecting coating on one side of said body to form a surface with a vertex and a focal plane and an optical axis and an anti-reflecting coating on the other side of said body, a cathode-ray tube having an aspherically curved screen comprising a metal target and a coating on which an image may be formed, said tube having a deflection center and means mounting said tube with said deflection center generally at said vertex and with said screen coating generally in said focal plane in the paraxial region of said surface.

2. A viewing system including in combination a sectioned aspheric reflecting surface having a vertex and a focal plane and an optical axis, a cathode-ray tube having a deflection center and an aspherically curved screen comprising a metal target and an image-forming coating carried by said target and means mounting said tube with said deflection center generally at said vertex and with said screen coating generally in said focal plane in the paraxial region of said surface.

3. A viewing system including in combination a sectioned aspheric reflecting surface having a focal plane and an optical axis and a vertex on said axis, a cathode-ray tube having a screen with a back having a curved surface on which an image may be formed and having a deflection center and means mounting said tube with said screen back surface generally in said focal plane in the paraxial region of said reflecting surface and with said deflection center generally at said surface.

4. A viewing system including in combination a sectioned aspheric image combiner comprising a transparent body, a partially reflecting coating on one side of said body forming a surface with an optical axis and a focal plane, a cathode-ray tube having a curved screen comprising a metal target and an image-forming coating on said target and means mounting said tube with said screen coating generally in said focal plane in the paraxial region of said surface.

5. A viewing system including in combination an image combiner comprising a transparent body provided with an aspheric partially reflecting surface having an optical axis and a focal plane and a vertex on said axis, an imaging tube having a curved screen comprising a metal target and a coating on said target on which an image may be formed and having a deflection center and means mounting said tube with said coating generally in said focal plane in the paraxial region of said surface and with said deflection center generally at said axis.

6. A viewing system including in combination an image combiner comprising a transparent body provided with an aspheric partially reflecting surface having a vertex and a focal plane and an optical axis, a cathode-ray tube having a deflection center and a screen on which an image may be formed and means mounting said tube with said screen generally in said focal plane and with said deflection center generally at said vertex.

7. A system for enabling an aircraft pilot having a normal line of sight from a head up viewing position concomitantly to view a distant scene outside the aircraft and an image of an instrument within the aircraft including in combination, an image combiner comprising a transparent body and a sectioned aspheric reflecting surface having a focal plane and an optical axis, an element having a surface adapted to carry an image, means mounting said image combiner in said line of sight from said viewing position with said axis below and generally parallel to said line of sight and means mounting said element below said line of sight generally in said focal plane in the paraxial region of said surface.

8. A system for enabling an aircraft pilot having a normal line of sight from a head up viewing position concomitantly to view a distant scene outside the aircraft and an image of an instrument within the aircraft including in combination, a sectioned aspheric image combiner comprising a transparent body having a reflecting surface with a focal plane and an optical axis, an element having a surface adapted to carry an image, means mounting said image combiner in the line of sight from said viewing position with said axis below and generally parallel to said line of sight, and means mounting said element with its surface generally in said focal plane in the paraxial region of said combiner.

9. A viewing system for enabling an observer having a normal line of sight from a head up viewing position concomitantly to view a distant scene and an image of an instrument including in combination, an image combiner comprising a transparent body provided with an aspheric partially reflecting surface having a focal plane and an optical axis, an imaging tube having a screen and having an electron gun and having an axis extending from said gun through the center of said screen, means mounting said image combiner in said line of sight with its axis below and generally parallel to the line of sight and means mounting said imaging tube with its screen in said focal plane and with its axis lying generally along the axis of said combiner.

References Cited

UNITED STATES PATENTS

| 2,166,399 | 7/1939 | Dowsett | 178—7.85 |
| 2,927,315 | 3/1960 | Calder | 178—7.85 |
| 3,230,819 | 1/1966 | Noxon | 178—61 |
| 2,305,855 | 12/1942 | Epstein | 313—92 |
| 2,453,003 | 11/1948 | Edwards | 313—92 |
| 2,466,329 | 4/1949 | Samson | 313—92 |
| 3,126,495 | 3/1964 | Kurtin | 313—89 |

ROBERT L. GRIFFIN, *Primary Examiner.*

JOSEPH A. ORSINO, JR. *Assistant Examiner.*

U.S. Cl. X.R.

313—89; 350—293, 307